United States Patent
Kishimoto et al.

(10) Patent No.: US 7,341,766 B2
(45) Date of Patent: Mar. 11, 2008

(54) GAS BARRIER CLEAR FILM, AND DISPLAY SUBSTRATE AND DISPLAY USING THE SAME

(75) Inventors: Yoshihiro Kishimoto, Tokyo-To (JP); Minoru Komada, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 11/193,288

(22) Filed: Jul. 29, 2005

(65) Prior Publication Data

US 2007/0026168 A1    Feb. 1, 2007

(51) Int. Cl.
*G02F 1/1333* (2006.01)

(52) U.S. Cl. ............. 428/1.6; 428/1.51; 428/1.52; 428/446; 428/447; 349/122; 349/158; 525/100

(58) Field of Classification Search ............. 428/1.1, 428/1.6, 1.5–1.54, 446–447; 349/122, 158; 525/100

See application file for complete search history.

(56) References Cited

U.S. PATENT DOCUMENTS 6,171,663 B1 *  1/2001  Hanada et al. .......... 349/139
6,866,949 B2 *  3/2005  Ota et al. .............. 428/702
7,229,703 B2 *  6/2007  Kawashima et al. ...... 428/690
2005/0175831 A1 *  8/2005  Kim et al. .............. 428/323

\* cited by examiner

*Primary Examiner*—Rena Dye
*Assistant Examiner*—Sow-Fun Hon
(74) *Attorney, Agent, or Firm*—Burr & Brown

(57) ABSTRACT

There is provided a gas barrier clear film 10 as a polymer substrate that is flexible, is light, is free from cracking, can be bent, has a high level of heat resistance, is excellent particularly in gas shielding properties, and can be used as an alternative to glass substrates.

The gas barrier clear film comprises: a clear resin base material film 11 having a coefficient of linear expansion of 15 to 100 ppm/K and a glass transition temperature Tg of 150 to 300° C.; and a first clear inorganic compound layer 13A, a sol-gel coat layer 15A, and a second clear inorganic compound layer 13B provided in that order on the clear resin base material film 11. The second clear inorganic compound layer 13B has an Ra (average roughness) value of not more than 5 nm and an Rmax (maximum roughness) value of not more than 80 nm.

6 Claims, 1 Drawing Sheet

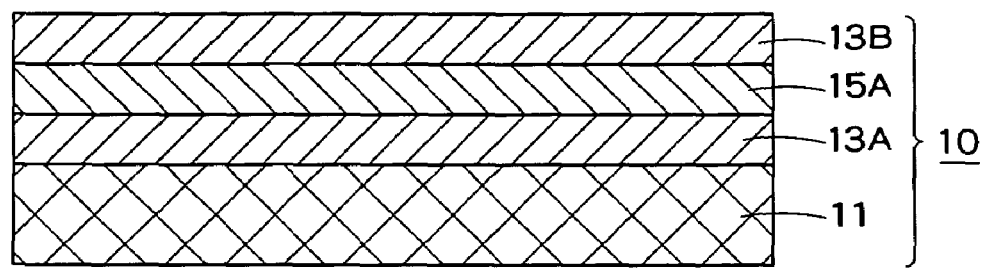
F I G. 1
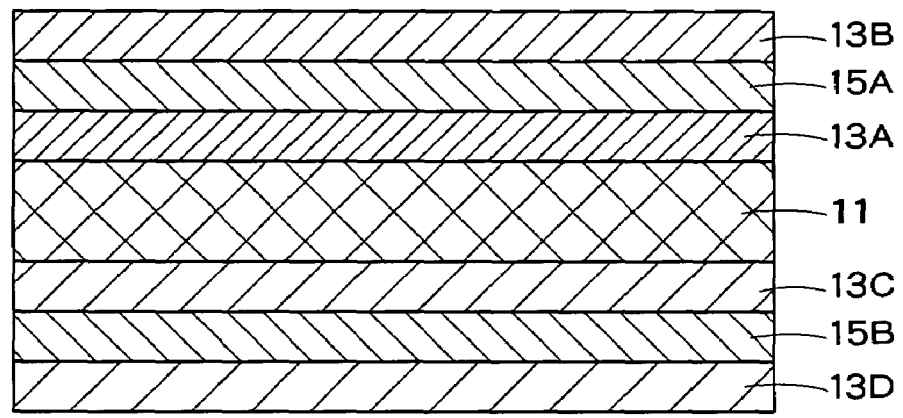
F I G. 2
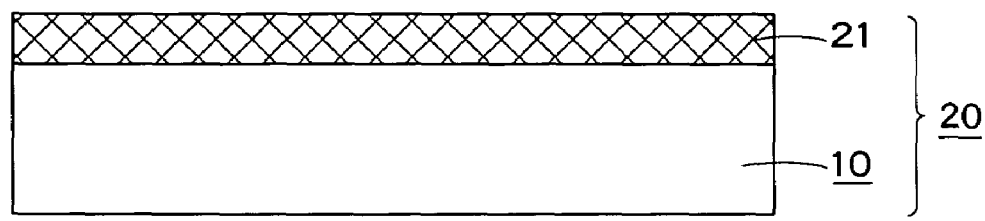
F I G. 3

GAS BARRIER CLEAR FILM, AND DISPLAY SUBSTRATE AND DISPLAY USING THE SAME

TECHNICAL FIELD

The present invention relates to a gas barrier clear film. More particularly, the present invention relates to a gas barrier clear film, which possesses excellent flexibility, transparency, heat resistance, solvent resistance, gas barrier properties, and interlaminar adhesion, and a display substrate and a display using the same. Major applications of the gas barrier clear film are lightweight, cracking-free, and bendable support base materials usable as alternatives to those in which glass has hitherto been utilized as the support base material, for example, film substrates for displays, film substrates for lighting, film substrates for solar batteries, film substrates for circuit boards, and electronic papers.

The "ratio", "parts", "%", etc. as used herein in conjunction with formulation are by mass unless otherwise specified, and the mark "/" represents the state of integral lamination.

"Shielding properties", "EL", "LCD", "panel", and "(meth)acrylate" are abbreviation, functional expression, common name, or industrial term for "barrier properties", "electroluminescence", "liquid crystal display", "element", and "general term for acrylate and methacrylate", respectively.

According to the definition of film and sheet in JIS K 6900, the sheet refers to a flat product that is thin and is generally small in thickness as compared with the length and width thereof, and the film refers to a thin flat product that is very small in thickness as compared with the length and width thereof and has an arbitrarily limited maximum thickness and is generally supplied as a roll. Accordingly, sheets having a particularly small thickness can be regarded as films. However, the boundary between the sheet and the film is not clear and cannot be clearly distinguished from each other without difficulties, and, thus, in the present specification, the "film" is defined as a term encompassing both the sheet and the film.

BACKGROUND ART

A number of properties which can withstand use under severe conditions, such as gas shielding (gas barrier) properties, flexibility, transparency, heat resistance, solvent resistance, and interlaminar adhesion are required of substrates in the field of electronic devices for displays, lighting, solar batteries, circuit boards and the like.

For this reason, only substrates of inorganic materials such as Si wafers and glass could have hitherto been used as the substrate for electronic devices. However, substrates of light, cracking-free, and bendable polymer materials (hereinafter referred to as "polymer substrate") have been desired for meeting recent demands for a weight reduction in products, improved flexibility of substrates, a cost reduction, improved handleability and the like. To this end, studies have been made on the use of synthetic resin sheets or synthetic resin films instead of glass substrates which have been used for constituting conventional displays. In particular, for display applications for organic ELs and film liquid crystals, clear and heat-resistant polymer substrates have been desired. Polymer substrates, however, generally have much larger gas permeability than substrates formed of inorganic materials such as glass. Therefore, in electronic devices using a polymer substrate, since a necessary degree of vacuum within electronic devices cannot be maintained, such electronic devices are disadvantageous, for example, in that gas is passed through the polymer substrate and enters the electronic device, and diffused oxygen oxidizes and deteriorates the device. Accordingly, regarding the prevention of the entry of external oxygen and water vapor, an ultrahigh level of barrier properties has been desired for prolonging the service life of displays.

Thus, gas barrier clear films usable in polymer substrates, which have excellent gas barrier properties, have light weight, are free from cracking, are bendable, and overall properties suitable as an alternative to glass substrates, should meet a number of strict property requirements such as flexibility, transparency, heat resistance, solvent resistance, and interlaminar adhesion, particularly water vapor, oxygen and other gas barrier properties.

Clear resin films have hitherto been known as a substrate of organic electroluminescent elements (see, for example, Japanese Patent Laid-Open Nos. 251429/1990 and 124785/1994). In these organic EL elements, however, the organic film is disadvantageously deteriorated by oxygen and water vapor which enter the organic EL element through a clear resin film. This disadvantageously leads to problems such as unsatisfactory luminescence characteristics and unreliable durability. That is, any highly gas barrier clear resin film, which has satisfactory gas barrier properties in the field of electronic devices such as displays and can ensure good quality of gas barrier objects by virtue of the satisfactory gas barrier properties, has not been developed.

To overcome the above problems, a method for forming a gas barrier layer on a clear heat-resistant base material by sputtering has been proposed (see, for example, Japanese Patent Laid-Open No. 222508/1999). As described in the working examples of the publication, however, the gas barrier level achieved by this method is as low as about 1 $cm^3/m^2$ in terms of oxygen permeability.

Further, interposition of an adhesive layer has been proposed in order to improve the adhesion between the resin film and the gas barrier layer (see, for example, Japanese Patent Laid-Open No. 109314/1997). This proposal, however, does not take into consideration the suppression of pinholes in the gas barrier layer derived from protrusions present on the surface of the resin film. Therefore, according to the results of the working examples in this publication, the water vapor permeability is 0.1 $g/m^2$, indicating that the gas barrier properties of this film are still disadvantageously unsatisfactory for use as a gas barrier film in electronic device applications.

Furthermore, a method is also known in which one or more polymerizable monomers in addition to a silane compound component are emulsion polymerized in water to prepare a water dispersed polymer which is used as a gas barrier layer (see, for example, Japanese Patent Laid-Open Nos. 3206/1995 and 18221/1995). In these publications, however, although there is a description on the suppression of oxygen permeability, they do not refer to specific numerical values of the water vapor permeability.

DISCLOSURE OF THE INVENTION

The present invention has been made with a view to solving the above problems of the prior art.

An object of the present invention is to provide a clear film having an ultrahigh level of gas barrier properties by stacking a first clear inorganic compound layer, a sol-gel coat layer, and a second clear inorganic compound layer in that order on a clear resin base material film. Another object of the present invention is to provide a highly heat-resistant, flexible and gas barrier clear film by specifying a heat resistant temperature of the clear resin base material film (coefficient of linear expansion and glass transition temperature Tg) and a material for the sol-gel coat layer.

In order to solve the above problems of the prior art, according to one embodiment of the present invention there is provided a gas barrier clear film comprising: a clear resin base material film having a coefficient of linear expansion of 15 to 100 ppm/K and a glass transition temperature Tg of 150 to 300° C.; a first clear inorganic compound layer provided on at least one side of the clear resin base material film; a sol-gel coat layer provided on the surface of the first clear inorganic compound layer; and a second clear inorganic compound layer provided on the surface of the sol-gel coat layer, said second clear inorganic compound layer having an Ra (average roughness) value of not more than 5 nm, and an Rmax (maximum roughness) value of not more than 80 nm.

According to second aspect of the gas barrier clear film according to the present invention the first clear inorganic compound layer and/or the second clear inorganic compound layer are formed of a material selected from silicon oxide, silicon nitride, silicon carbide, aluminum oxide, magnesium oxide, indium oxide, and composites composed mainly of these compounds, and the first clear inorganic compound layer and/or the second clear inorganic compound layer are a gas barrier layer.

According to a third aspect of the gas barrier clear film according to the present invention the material for the so-gel coat layer is formed of a material selected from aminoalkyldialkoxysilanes, aminoalkyltrialkoxysilanes, and composites composed mainly of these compounds, said sol-gel coat layer is a reaction product produced by a chemical reaction mainly based on hydrolysis of the composite, and said sol-gel coat layer is a layer having the function of flattening the surface.

According to a fourth aspect of the gas barrier clear film according to the present invention a clear inorganic compound layer and a sol-gel coat layer are provided on the surface of the clear resin base material film remote from the first inorganic compound layer so that the whole gas barrier clear film compensates for stress.

According to a second embodiment of the present invention there is provided a display substrate comprising a display substrate and a gas barrier clear film according to the first embodiment stacked on at least one side of the display substrate.

According to a third embodiment of the present invention there is provided a display comprising a liquid crystal display panel or an organic EL panel as a display panel and a display substrate according to the second embodiment constituting a substrate at least on the viewer side of the display panel.

The present inventor has made extensive and intensive studies on a gas barrier clear film having a high level of gas barrier properties and, as a result, has aimed at the fact that the following matter is considered as a cause of the low level of gas barrier properties of a gas barrier clear film in which a clear resin film has been adopted as a base material film. Specifically, in general, the surface of a polymer constituting a resin film or the like has an Ra (average roughness) value of not less than 2 nm, an Rmax (maximum difference of elevation) value of not less than 80 nm, and has in parts protrusions having a height of about 500 nm (0.5 µm). That is, the surface is microscopically in a roughened state. When a gas barrier layer in the form of a thin film having a thickness of about 20 nm is formed on the above resin film, pinholes are formed in the gas barrier layer by protrusions present on the surface of the resin film and the formed pinholes are causative of deteriorated gas barrier properties. The present inventor has aimed at this fact. This has led to the completion of the present invention.

According to the invention as defined in claims 1 to 3, a gas barrier clear film, which has an ultrahigh level of gas barrier properties and a high level of heat resistance and flexibility (by specifying the heat resistant temperature of the base material (coefficient of linear expansion) and a material for the sol-coat layer) and is usable as an alternative to glass substrate, can be provided by stacking a first clear inorganic compound layer, a sol-gel coat layer, and a second clear inorganic compound layer in that order on a clear resin base material film.

According to the invention as defined in claim 4, since a third clear inorganic compound layer and a second sol-gel coat layer are provided on the surface of the clear resin base material film remote from the first inorganic compound layer, the stress is offset as a whole and, thus, a gas barrier clear film which is less likely to cause cracking during production and is highly durable in practical use can be provided.

The invention as defined in claim 5 can provide a display substrate that is excellent in flexibility, transparency, heat resistance, solvent resistance, and interlaminar adhesion, particularly gas barrier properties, and can be used as an alternative to glass substrates.

The invention as defined in claim 6 can provide a display that has light weight, is free from cracking, and is bendable.

BRIEF DESCRIPTION OF THE DRAWINGS

FIG. 1 is a cross-sectional view showing one embodiment of the gas barrier clear film according to the present invention;

FIG. 2 is a cross-sectional view showing one embodiment of the gas barrier clear film according to the present invention; and FIG. 3 is a cross-sectional view showing a display substrate comprising the gas barrier clear film according to the present invention.

BEST MODE FOR CARRYING OUT THE INVENTION

A gas barrier clear film 10 according to the present invention includes a clear resin base material film 11. A first clear inorganic compound layer 13A, a sol-gel coat layer 15, and a second clear inorganic compound layer 13B are provided in that order on at least one side of the clear resin base material film 11. Specifically, the gas barrier clear film 10 has a layer construction of clear resin base material film 11/first clear inorganic compound layer 13A/sol-gel coat layer 15/second clear inorganic compound layer 13B.

In order to compensate for the stress, the layer construction is preferably such that the layer construction on the front side is symmetrical or substantially symmetrical with the layer construction on the back side. Examples of layer constructions include a layer construction (approximately symmetrical) of second sol-gel coat layer 15B/third clear inorganic compound layer 13C/clear resin base material film 11/first clear inorganic compound layer 13A/sol-gel coat layer 15/second clear inorganic compound layer 13B, and a layer construction (front side and back side being symmetrical with each other) of fourth clear inorganic compound layer 13D/second sol-gel coat layer 15B/third clear inorganic compound layer 13C/clear resin base material film 11/first clear inorganic compound layer 13A/sol-gel coat layer 15/second clear inorganic compound layer 13B.

Here the clear resin base material film 11 has a coefficient of linear expansion of 15 to 100 ppm/K and a Tg value of 150 to 300° C., and the second clear inorganic compound layer has a surface roughness Ra value of not more than 5 nm and an Rmax (maximum roughness) of not more than 80 nm. The light transmittance is preferably not less than 80%.

(Clear Resin Base Material Film)

In the gas barrier clear film 10 according to the present invention, a clear resin base material film having a coefficient of linear expansion of not less than 15 ppm/K and not more than 100 ppm/K and a Tg value of 150° C. or above and 300° C. or below is used as the clear resin base material film 11. This clear resin base material film 11 meets requirements for use in electronic component applications and laminate films for displays. Specifically, when gas barrier clear film 10 according to the present invention is used in these applications, the gas barrier clear film 10 is sometimes exposed to a process which is carried out at a temperature of 150° C. or above. In this case, when the coefficient of linear expansion of the clear resin base material film 11 in the gas barrier clear film 10 exceeds 100 ppm/K, in subjecting the gas barrier clear film 10 to the process exposed to the above temperature, problems are likely to occur, including, for example, that the dimension of the substrate is not stable, and barrier properties are deteriorated by thermal expansion and shrinkage, or the film cannot withstand the thermal process. When the coefficient of linear expansion is less than 15 ppm/K, the film has deteriorated flexibility and is cracked as in glass.

The clear resin base material film 11 used in the present invention is characterized by having a Tg value of 150° C. or above and 300° C. or below. When the Tg value is below 150° C., in subjecting the gas barrier film to the process exposed to the above temperature, problems are likely to occur including, for example, that the dimension of the substrate is not stable, and barrier properties are deteriorated by thermal expansion and shrinkage, or the film cannot withstand the thermal process. When the Tg value is above 300° C., the film is likely to crack as in glass and undergoes a deterioration in flexibility. Further, regarding the clear resin base material film 11 having no Tg value, the effect of the coefficient of linear expansion on the flexibility is so large that such film is out of the question.

Materials for the clear resin base material film 11 used in the present invention include poly(meth)acrylate (PAR), polyimide (PI), polyamidoimide (PAI), polyethersulfone (PES), polycarbonate (PC), polynorbornene as a cyclic polyolefin copolymer, cyclic polyolefin resins, polycyclohexene, polyetherketone (PEK), polyetheretherketone (PEEK), polyetherimide (PEI), polysiloxane ethylene-ethylene tetrafluoride copolymer (ETFE), ethylene chloride trifluoride (PFA), ethylene tetrafluoride-perfluoroalkyl vinyl ether copolymer (FEP), polyvinylidene fluoride (PVDF), polyvinyl fluoride (PVF), perfluoroethylene-perfluoropropylene-perfluorovinyl ether copolymer (EPA) or other fluororesins.

Examples of preferred cyclic polyolefins include cycloolefin polymers (tradename; "ZEONOR", manufactured by Zeon Corporation) and norbornene resins (tradename; "ARTON", manufactured by JSR Corporation). Further preferred cyclic polyolefins include resin compositions containing an (meth)acrylate compound having a cycloalkyl structure and its derivative as disclosed in Japanese Patent Laid-Open No. 222508/1999.

The material for the clear resin base material film 11 may be composed mainly of a resin and includes, for example, a material comprising a resin impregnated into a reinforcing material, such as polyepoxide-impregnated glass cloth. In this case, the Tg value is Tg of the impregnated resin.

(First Clear Inorganic Compound Layer)

The first clear inorganic compound layer 13A is a layer that, in the gas barrier clear film 10, is provided between the clear resin base material film 11 and the overlying sol-gel coat layer 15 and second clear inorganic compound layer 13B in order to provide, in addition to the function of shielding water vapor permeation and oxygen permeation, the function of firmly bonding these layers to prevent film separation of overlying sol-gel coat layer 15 and second clear inorganic compound layer 13B by stress of the laminate. Further, the first clear inorganic compound layer 13A functions to prevent release of gas from the base material.

The thin film such as the second clear inorganic compound 13B is formed under high vacuum conditions. Therefore, when gas is released from the clear resin base material film 11 under high vacuum conditions, the film formation is inhibited, and, consequently, a dense film cannot be formed. The first clear inorganic compound layer 13A can function to prevent the release of gas and thus to realize stable film formation.

The first clear inorganic compound layer 13A may be formed of a material having gas barrier properties, for example, an oxide such as silicon oxide, aluminum oxide, magnesium oxide, indium oxide, calcium oxide, zirconium oxide, titanium oxide, boron oxide, hafnium oxide, or barium oxide; a nitride such as silicon nitride, aluminum nitride, boron nitride, or magnesium nitride; a carbide such as silicon carbide; or a sulfide.

Further, an oxynitride as a composite of two or more compounds selected from the above compounds, and, further, a carbon-containing oxycarbide layer, inorganic carbonitride layer, inorganic oxycarbonitride or the like may also be used.

Examples thereof include inorganic oxides (MOx), inorganic nitrides (MNy), inorganic carbides (MCz), inorganic oxycarbides (MOxCz), inorganic carbonitrides (MNyCz), inorganic oxynitrides (MOxNy), and inorganic oxycarbonitrides (MOxNyCz). In this case, M is preferably a metal element such as Si, Al, Ti or the like.

(Inorganic Oxynitride Film)

The inorganic oxynitride film may be basically any film so far as it is a thin film formed by vapor deposition of an oxynitride of a metal, and examples thereof include inorganic oxynitride films of oxynitrides of metals such as silicon (Si), aluminum (Al), magnesium (Mg), calcium (Ca), potassium (K), tin (Sn), sodium (Na), boron (B), titanium (Ti), lead (Pb), zirconium (Zr), and yttrium (Y). Preferred are oxynitrides of metals such as silicon (Si), aluminum (Al), and titanium (Ti). The inorganic oxynitride film may be called a metal oxynitride such as silicon oxynitride, aluminum oxynitride, or titanium oxynitride and may be represented by MOxNy wherein M represents a metal element and value ranges of x and y vary depending upon the metal element, such as SiOxNy, AlOxNy, or TiOxNy. The value range of x and the value range of y are x=1.0 to 2.0 and y=0.1 to 1.3 for silicon (Si); x=0.5 to 1.0 and y=0.1 to 1.0 for aluminum (Al); x=0.1 to 1.0 and y=0.1 to 0.6 for magnesium (Mg); x=0.1 to 1.0 and y=0.1 to 0.5 for calcium (Ca); x=0.1 to 0.5 and y=0.1 to 0.2 for potassium (K); x=0.1 to 2.0 and y=0.1 to 1.3 for tin (Sn); x=0.1 to 0.5 and y=0.1 to 0.2 for sodium (Na); x=0.1 to 1.0 and y=0.1 to 0.5 for boron (B); x=0.1 to 2.0 and y=0.1 to 1.3 for titanium (Ti); x=0.1 to 1.0 and y=0.1 to 0.5 for lead (Pb); x=0.1 to 2.0 and y=0.1 to 1.0 for zirconium (Zr); and x=0.1 to 1.5 and y=0.1 to 1.0 for yttrium (Y). In the above formulae, when x=0, the material is a complete metal which is not clear and thus cannot be used. In the present invention, preferred metal oxynitrides include oxynitrides of silicon (Si), aluminum (Al), titanium (Ti), and tin (Sn). The value range of x and the value range of y may be, for example, x=1.0 to 2.0 and y=0.1 to 1.3 for silicon (Si); x=0.5 to 1.0 and y=0.1 to 1.0 for aluminum (Al); and x=1.0 to 2.0 and y=0.1 to 1.3 for titanium (Ti).

Among others, a film formed of silicon oxide is preferred because it is highly clear and has gas barrier properties. A film formed of silicon nitride is further preferred because it has a higher level of gas barrier properties. A film formed of a composite composed of silicon oxide and silicon nitride is particularly preferred. When the content of silicon oxide is high, the transparency is increased, while, when the content of silicon nitride is high, the gas barrier properties are increased.

The clear inorganic compound layer 13A may be formed, for example, by vacuum deposition, sputtering, ion plating, thermal CVD or plasma CVD. These methods are selected by taking into consideration, for example, the type of the base material or the clear inorganic compound layer 13A (functionally a flattening facilitating layer for flattering), the type of the film forming material, the easiness of film formation and the process efficiency.

The thickness of the clear inorganic compound layer 13A is preferably 10 to 500 nm. When the thickness is less than 10 nm, gas barrier properties as the substrate for displays are unsatisfactory. On the other hand, when the thickness exceeds 500 nm, the stress of the layer per se is increased, leading to deteriorated flexibility. Further, in this case, disadvantageously, protrusions are likely to be formed due to abnormal grain growth, leading to increased Rmax.

(Sol-Gel Coat Layer)

The sol-gel coat layer 15 is formed on the surface of the first clear inorganic compound layer 13A and functions to further lower surface Ra and Rmax. This layer is a film formed by the step of coating and drying to cause hydrolysis and reaction using water or a hydrophilic solvent.

The first clear inorganic compound layer 13A and the sol-gel coat layer 15 function as a flattening layer. In particular, when both the layers are formed, since affinity for and wettability by the inorganic compound layer are good, these layers can fill, cover and clog defects such as holes, concaves, and cracks. Further, by virtue of good leveling properties, these layers can fill and cover defects, and, thus, the surface after drying is smooth. An ultrahigh level of flattening function can be realized by the synergistic effect of this affinity and leveling properties.

The surface after flattening has an Ra (average roughness) value of not more than 5 nm and an Rmax (maximum roughness) measured value of not more than 80 nm, and the resultant gas barrier clear film 10 can exhibit a high level of gas barrier properties. The lower limit of the center line average roughness Ra does not particularly exist. From a practical viewpoint, however, the lower limit of the center line average roughness Ra is 0.01 nm. By virtue of this, the gas barrier clear film 10 can exhibit an ultrahigh level of gas barrier properties.

In the prior art, a method has also been adopted in which the clear resin base material film 11 on its both sides, at least the side on which the first clear inorganic compound layer 13A is provided, is polished to improve the smoothness. This method suffers from a problem of the necessity of additionally providing the step of polishing. According to the present invention, this problem can be solved.

The sol-gel coat layer 15 may be formed, for example, by a conventional method such as a dry method (for example, sputtering, ion plating, or CVD), or a wet method (for example, spin coating, roll coating, or casting).

Among others, for example, aminoalkyldialkoxysilanes or aminoalkyltrialkoxysilanes are suitable as materials for the formation of the clear sol-gel coat layer 15 (flattening layer). The flattening layer can be formed by wet coating using these materials. In this case, when a coating composition containing these materials and a crosslinking compound as starting materials is coated onto the surface of the first clear inorganic compound layer 13A to form a coating which is then dried, in a reaction product obtained by a chemical reaction mainly based on hydrolysis, a sol-gel reaction involving hydrolysis, condensation, and crosslinking with a crosslinking compound proceeds to form a coating film of a polysiloxane having a crosslinked structure.

Japanese Patent Laid-Open Nos. 3206/1995 and 18221/1995 describes the use of the above alkoxysilane compound. However, in these publications, the alkoxysilane compound is coated for imparting gas barrier properties onto any desired plastic film to impart the function of shielding gas, and, thus, this coating is different in purpose from the clear sol-gel coat layer 15 provided for improving the flatness of the laminate in the present invention.

Further, even when sol-gel coating agents as described in Japanese Patent Nos. 3438266 and 3438267 are used, the flatness is unsatisfactory. The present inventors have found that, only when an aminoalkyldialkoxysilane or an aminoalkyltrialkoxysilane or the like is formed on the surface of the first clear inorganic compound layer 13A, satisfactory flatness is provided and, further, the provision of a barrier layer (a second clear inorganic compound layer 13B) on the flat face can develop an ultrahigh level of barrier properties.

(Second Clear Inorganic Compound Layer)

The second clear inorganic compound layer 13B as well has, in addition to the function of shielding the permeation of water vapor, oxygen or the like in the gas barrier clear film 10, the effect of preventing the release of gas from the sol-gel coat layer 15 and the effect of improving the surface quality of the laminate. For example, when the use of the gas barrier clear film as a substrate for displays is contemplated, a layer such as a clear electrode should be further provided on this face. When the second clear inorganic compound layer 13B is provided, an electrode layer having a high level of affinity, good adhesion, and excellent electrical conductivity can be formed.

The second clear inorganic compound layer 13B is preferably formed of a material comparable with the material used in the first clear inorganic compound layer 13A. Examples thereof include silicon oxide, silicon nitride, silicon carbide, aluminum oxide, magnesium oxide, and indium oxide, and a composite composed of two or more compounds selected from the above compounds. Among others, a film formed of silicon oxide is preferred because it is highly clear and has gas barrier properties. A film formed of silicon nitride is further preferred because it has a higher level of gas barrier properties. A film formed of a composite composed of silicon oxide and silicon nitride is particularly preferred. When the content of silicon oxide is high, the transparency is increased, while, when the content of silicon nitride is high, the gas barrier properties are increased.

The second clear inorganic compound layer 13B may be formed, for example, by vacuum deposition, sputtering, ion plating, thermal CVD or plasma CVD. These methods may be properly selected by taking into consideration, for example, the type of the base material and flattening layer, the type of the film forming material, the easiness of film formation and the process efficiency.

The thickness of the second clear inorganic compound layer 13B is preferably not less than 10 nm and not more than 500 nm. When the thickness is less than 10 nm, gas barrier properties as the substrate for displays are unsatisfactory. On the other hand, when the thickness exceeds 500 nm, the flexibility is deteriorated. Further, in this case, disadvantageously, protrusions are likely to be formed due to abnormal grain growth, leading to increased Rmax.

(Third Clear Inorganic Compound Layer)

The third clear inorganic compound layer 13C may be formed of the same material as used in the first clear inorganic compound layer 13A and the second clear inorganic compound layer 13B.

(Fourth Clear Inorganic Compound Layer)

The fourth clear inorganic compound layer 13D may be formed of the same material as used in the first clear inorganic compound layer 13A, the second clear inorganic compound layer 13B, and the third clear inorganic compound layer 13C.

(Second Sol-Gel Coat Layer)

The second clear sol-gel coat layer 15B, the same material and formation method as used in the first clear sol-gel coat layer 15 may be applied.

(Layer Construction)

For the above reason, the gas barrier clear film 10 has a basic layer construction of at least clear resin base material film 11/first clear inorganic compound layer 13A/clear sol-gel coat layer 15 for flattening/second clear inorganic compound layer 13B stacked in that order. In the conventional two-layer construction described, for example, in Japanese Patent Laid-Open No. 126419/1995, even when stacking is repeated, satisfactory properties cannot be provided. Thus, the construction as described in this publication is essentially different from the construction of the gas barrier clear film according to the present invention.

Further, a flattening layer (a sol-gel layer 15 or other comparable layer) and a clear inorganic compound layer may be repeatedly formed on this layer. This repeated formation can further enhance gas barrier properties. Even when defects are locally present in the substrate film (layer), the interposition of the sol-gel coat layer 15 can realize noncontinuous growth of the film which can eliminate the continuity of the defects. Therefore, a deterioration in barrier properties can be suppressed. In this case, even though detects are present, the probability of causing the defects in an overlapped state can be reduced to a very low level. Repeatedly stacking the flattening layer and the clear inorganic compound layer in that order onto the clear inorganic compound layer once to five times is preferred from the viewpoint of imparting a high level of water vapor barrier properties and oxygen barrier properties.

(Symmetrical Layer Construction)

The layer construction of the gas barrier clear film is preferably such that an identical or substantially identical layer construction is provided both sides of the clear resin base material film 11 so that the front side construction and the back side construction are symmetrical with each other. In the gas barrier clear film 10, as shown in FIG. 2, a layer construction of third clear inorganic compound layer 13C/second clear sol-gel coat layer 15B, or a layer construction of third clear inorganic compound layer 13C/second clear sol-gel coat layer 15B/fourth clear inorganic compound layer 13D may be provided onto the surface of the clear resin base material film 11 remote from the first clear inorganic compound layer 13A. The additional provision of the clear inorganic compound layer and the like on the opposite side can offset or relax the stress produced in the formation of films only on one side of the clear resin base material film 11 and thus can prevent distortion, warpage (also known as curving or curling) and the like in the step of post processing including heating. Therefore, perpendicularity, dimensional accuracy, and dimensional accuracy in partial place can be improved. Further, for example, a problem of alignment at the time of patterning necessary in post processing such as electrode formation can also be eliminated. Further, bias of the flexibility is eliminated, and, thus, a problem associated with the use of the film can be solved.

Further, at the same time, since release of gas from the opposite surface of the gas barrier clear film can be prevented, a dense, uniform-thickness and good-quality gas barrier clear film can be stably formed. More preferably, in forming a clear inorganic compound layer also on the opposite side, for example, the thickness of the layer formed, the inorganic material used, and layer construction are taken into consideration for stress offset or relaxation purposes.

The material used for forming the clear inorganic compound layer on the opposite side is not limited to silicon oxide, silicon nitride and a composite thereof, and any desired clear inorganic compound such as aluminum oxide or indium oxide may also be used. Among them, silicon oxide, silicon nitride and a composite thereof as described above are preferred.

The material used for forming the clear sol-gel coat layer formed on the opposite side may be the same as used in the clear sol-gel coat layer 15.

(Display Substrate)

As shown in FIG. 3, the display substrate comprises a clear electrically conductive layer 21 provided on the uppermost layer of the gas barrier clear film 10 according to the present invention. This display substrate is excellent in transparency, heat resistance, solvent resistance, gas barrier properties, and interlaminar adhesion. The material for the clear electrically conductive layer 21 is not particularly limited so far as the material is clear and electrically conductive, and examples thereof include tin oxide, indium oxide, ITO, ATO, or silver.

(Display)

The display substrate may be applied to any display and is suitable for application to thin-shaped displays with a small depth, such as plasma display panels (PDPs), liquid crystal displays (LCDs), organic or inorganic electroluminescent displays (ELDs), and field emission displays (FEDs).

(LDCs)

A liquid crystal display comprises two glass substrates each having on its inner side a clear electrode and, further, an aligning layer and the like, and a liquid crystal held between the glass substrates the periphery of the assembly having been sealed. This display further comprises a color filter for colorization. The gas barrier film 10 according to the present invention can be applied to the outer side of the glass substrate of the liquid crystal display. Alternatively, the gas barrier film 10 according to the present invention can be used instead of the glass substrate. In particular, when the two glass substrates are replaced with the gas barrier film 10 according to the present invention, a display the whole of which is flexible can be provided.

(Organic ELD)

An organic EL display again comprises two glass substrates each having on its inner side a transparent electrode and, held between the two glass substrates, an organic EL element layer, formed of, for example, a composite layer comprising a laminate of (a) a layer having an injection function, (b) a transport function, and (c) a luminescent function, the periphery of the assembly having been sealed. This organic EL display often includes a color filter for colorization or other means. For example, when an EL display is constructed, for example, a layer construction of display substrate according to the present invention (including patterned clear electrically conductive layer)/hole injection layer/hole transport layer/luminescent layer/electron injection layer/cathode/sealing layer may be mentioned. The layer construction, however, is not limited to this layer construction only.

As with the case of the liquid crystal display, the gas barrier film 10 according to the present invention may be applied to the outer side of the glass substrate, or alternatively, the gas barrier film 10 according to the present invention may be used instead of the glass substrate. When the two glass substrates are replaced with the gas barrier film 10 according to the present invention, a display the whole of which is flexible can be provided. In particular, it should be noted that, since the organic EL element utilizes fluorescent emission, it is chemically unstable and is very low resistance to moisture and, thus, it is desirable for the organic EL element product has a high level of water vapor barrier properties.

The following Examples and Comparative Examples further illustrate the present invention. However, it should be noted that, the present invention is not limited to them.

EXAMPLES

Example 1

A clear resin base material film formed of a cyclic polyolefin resin having a thickness of 200 μm, a coefficient of linear expansion of 80 ppm/K, and a Tg value of 176° C. (manufactured by Nippon Zeon Co., Ltd.) was provided. A 50 nm-thick silicon oxynitride film was formed by sputtering on one side of the clear resin base material film. A coating agent composed mainly of an aminoalkyltrialkoxysilane was spin coated onto the silicon oxynitride film, and the assembly was dried on a hot plate at 120° C. for 2 min and was then dried in a drier at 160° C. for one hr to form a 1 μm-thick sol-gel coat layer (a flattening layer). Further, a 50 nm-thick silicon oxynitride film was formed as a second inorganic compound layer by sputtering on the flattening layer to prepare a gas shielding film of Example 1.

Example 2

The procedure of Example 1 was repeated, except that a clear resin base material film formed of a polycarbonate resin having a thickness of 200 μm, a coefficient of linear expansion of 97 ppm/K, and a Tg value of 165° C. (Bayer Ltd.) was used.

Example 3

The procedure of Example 1 was repeated, except that a clear resin base material film formed of a polyacrylate resin having a thickness of 200 μm, a coefficient of linear expansion of 55 ppm/K, and a Tg value of 300° C. (manufactured by Mitsubishi Chemical Corporation) was used.

Example 4

The procedure of Example 1 was repeated, except that a clear resin base material film formed of a polyepoxide-impregnated glass cloth having a thickness of 200 μm, a coefficient of linear expansion of 16 ppm/K, and a Tg value of 214° C. (manufactured by Sumitomo Bakelite Co., Ltd.) was used.

Example 5

The gas shielding film prepared in Example 1 was provided. The same layer construction as formed on the clear resin base material film was formed on the surface of clear resin base material film remote from the layer construction formed in Example 1.

Example 6

The gas shielding film prepared in Example 1 was provided. A 150 nm-thick ITO film was formed by sputtering on the top surface of the gas barrier clear film.

Comparative Example 1

The procedure of Example 1 was repeated, except that a clear resin base material formed of a soda lime glass having a thickness of 700 μm and a coefficient of linear expansion of 8.5 ppm/K (manufactured by CENTRAL GLASS CO., LTD.) was used.

Comparative Example 2

The procedure of Example 1 was repeated, except that a clear resin base material film formed of a PET resin having a thickness of 188 μm, a coefficient of linear expansion of 4.5 ppm/K, and a Tg value of 78° C. (manufactured by Toyobo Co., Ltd.) was used.

Comparative Example 3

The procedure of Example 1 was repeated, except that a clear resin base material film formed of a polycarbonate resin having a thickness of 188 μm, a coefficient of linear expansion of 230 ppm/K, and a Tg value of 155° C. (manufactured by Teijin Ltd.) was used.

Comparative Example 4

The procedure of Example 1 was repeated, except that, for sol-gal coat layer formation, a coating agent composed mainly of tetraethylorthosilicate was spin coated onto the silicon oxynitride film, and the assembly was dried on a hot plate at 120° C. for 2 min and was then dried in a drier at 160° C. for one hr to form an about 1 μm-thick sol-gel coat layer (a flattening layer).

(Measurement)

The coefficient of linear expansion was measured according to JIS K 7197 with a thermomechanical analyzer manufactured by MAC CORPORATION in the measuring temperature range of 25 to 200° C.

The light transmittance was measured according to JIS K 7105.

The surface roughness Ra was determined by measuring the average roughness (Ra) and the maximum difference of elevation (Rmax) in a scanning range of 20 μm with an atomic force microscope (manufactured by Seiko Corporation).

The electrical conductivity was measured according to JIS K 7194 with a surface electrical resistivity measuring device (Loresta AP, manufactured by Mitsubishi Petrochemical Co., Ltd.) by a four point probe method.

The water vapor permeability was measured according to JIS K 7129 with a water vapor permeability measuring device PERMATRAN 3/31 (tradename; manufactured by MOCON CORPORATION) under conditions of 40° C. and 100% Rh.

(Evaluation)

For the gas barrier clear film, properties were evaluated in terms of moisture permeability (as measured by the above method) after a bending test and a heat resistance test and appearance after the bending test.

In the bending test, the gas barrier clear film was wound around a cylinder of 50 mm in diameter. In this case, for the top surface and the back surface, winding was carried out each twice alternately. After the assembly was held for 5 min, the appearance was visually inspected and the water vapor permeability was measured.

In the heat resistance test, the gas barrier clear film was placed in an oven of 150° C. for one hr, and this was repeated three times. Thereafter, the water vapor permeability was measured.

In the appearance inspection, after the bending test, the gas barrier clear film was visually inspected. In this case, when there was none of cracking, warpage, and deformation, the appearance was evaluated as "○". On the other hand, when there was cracking, warpage, or/and deformation, the appearance was evaluated as "x".

For the Examples and Comparative Examples, the results of measurement and evaluation on the coefficient of thermal expansion, glass transition temperature, surface roughness Ra and Rmax, appearance after the bending test, initial moisture permeability, moisture permeability after the bending test, and moisture permeability after the heat resistance test are shown in "Table 1."

TABLE 1

| | Coefficient of linear expansion | Tg | Light transmittance | Ra | Rmax | Appearance after the bending test | Initial moisture permeability | Moisture permeability after the bending test | Moisture permeability after the heat resistance test |
|---|---|---|---|---|---|---|---|---|---|
| Example 1 | 80 | 176 | 92 | 1.10 | 80 | ○ | Not more than 0.05 | Not more than 0.05 | Not more than 0.05 |
| Example 2 | 97 | 165 | 91 | 0.86 | 74 | ○ | Not more than 0.05 | Not more than 0.05 | Not more than 0.05 |
| Example 3 | 55 | 300 | 89 | 0.56 | 36 | ○ | Not more than 0.05 | Not more than 0.05 | Not more than 0.05 |
| Example 4 | 16 | 214 | 88 | 1.95 | 25 | ○ | Not more than 0.05 | Not more than 0.05 | Not more than 0.05 |
| Example 5 | 80 | 176 | 92 | 1.08 | 76 | ○ | Not more than 0.05 | Not more than 0.05 | Not more than 0.05 |
| Example 6 | 80 | 176 | 92 | 0.75 | 34 | ○ | Not more than 0.05 | Not more than 0.05 | Not more than 0.05 |
| Comparative Example 1 | 8.5 | — | — | 0.65 | 46 | X | Not more than 0.05 | Measurement impossible | Not more than 0.05 |
| Comparative Example 2 | 4.5 | 78 | 89 | 1.49 | 137 | ○ | Not more than 0.05 | Not more than 0.05 | 0.59 |
| Comparative Example 3 | 230 | 155 | 91 | 0.83 | 103 | ○ | Not more than 0.05 | Not more than 0.05 | 0.24 |
| Comparative Example 4 | 80 | 176 | 92 | 2.16 | 274 | ○ | Not more than 0.05 | Not more than 0.05 | 0.15 |

Note) Unit:
Light transmittance: ppm/° C.
Glass transition temperatureTg: ° C.
Light transmittance: %
Ra: nm
Rmax: mm
Moisture permeability: $g/m^2 \cdot 24$ h
Not more than 0.05 expresses below the detection limit (Results of Evaluation)

For Examples 1 to 6, the initial water vapor permeability was good, and the good water vapor permeability remained unchanged after the bending test and the heat resistance test. Further, the appearance was also good.

For Comparative Example 1, the initial water vapor permeability was good. After the bending test, however, the water vapor permeability was significantly deteriorated and thus was immeasurable. Further, regarding the appearance after the bending test, cracking was observed, and, thus, the appearance was a failure.

For Comparative Examples 2 to 4, the appearance after the bending test was acceptable. For the water vapor permeability, however, although the initial water vapor permeability was good, a deterioration in water vapor permeability was observed after the heat resistance test.

The invention claimed is:

1. A gas barrier clear film comprising: a clear resin base material film having a coefficient of linear expansion of 15 to 100 ppm/K and a glass transition temperature Tg of 150 to 300° C.; a first clear inorganic compound layer provided on at least one side of said clear resin base material film; a sol-gel coat layer provided on a surface of said first clear inorganic compound layer; a second clear inorganic compound layer provided on a surface of said sol-gel coat layer, said second clear inorganic compound layer having an Ra (average surface roughness) value of not more than 5 nm, and an Rmax (maximum surface roughness) value of not more than 80 nm, and an electrically conductive layer provided on a surface of said second clear inorganic compound layer.

2. The gas barrier clear film according to claim 1, wherein at least one of said first clear inorganic compound layer and said second clear inorganic compound layer is formed of a material selected from the group consisting of silicon oxide, silicon nitride, silicon carbide, aluminum oxide, magnesium oxide, indium oxide, and composites composed mainly of these compounds, and wherein at least one of said first clear inorganic compound layer and said second clear inorganic compound layer is a gas barrier layer.

3. The gas barrier clear film according to claim 1, wherein said sol-gel coat layer is formed of a material selected from the group consisting of aminoalkyldialkoxysilanes, aminoalkyltrialkoxysilanes, and composites composed mainly of these compounds, wherein said sol-gel coat layer is a reaction product produced by a chemical reaction mainly based on hydrolysis of said composites, and wherein said sol-gel coat layer is the surface adapted to flatten said surface of said first clear inorganic compound layer.

4. The gas barrier clear film according to claim 1, wherein another clear inorganic compound layer and another sol-gel coat layer are provided on a surface of said clear resin base material film remote from said first clear inorganic compound layer so that said gas barrier clear film as a whole is compensated for stress.

5. A display substrate comprising a display substrate and a gas barrier clear film according to claim 1 stacked on at least one side of said display substrate.

6. A display comprising one of a liquid crystal display panel and an organic EL panel as a display panel and said display substrate according to claim 5 constituting a substrate provided at least on a viewer side of said display panel.

\* \* \* \* \*